Figures 1, 2:
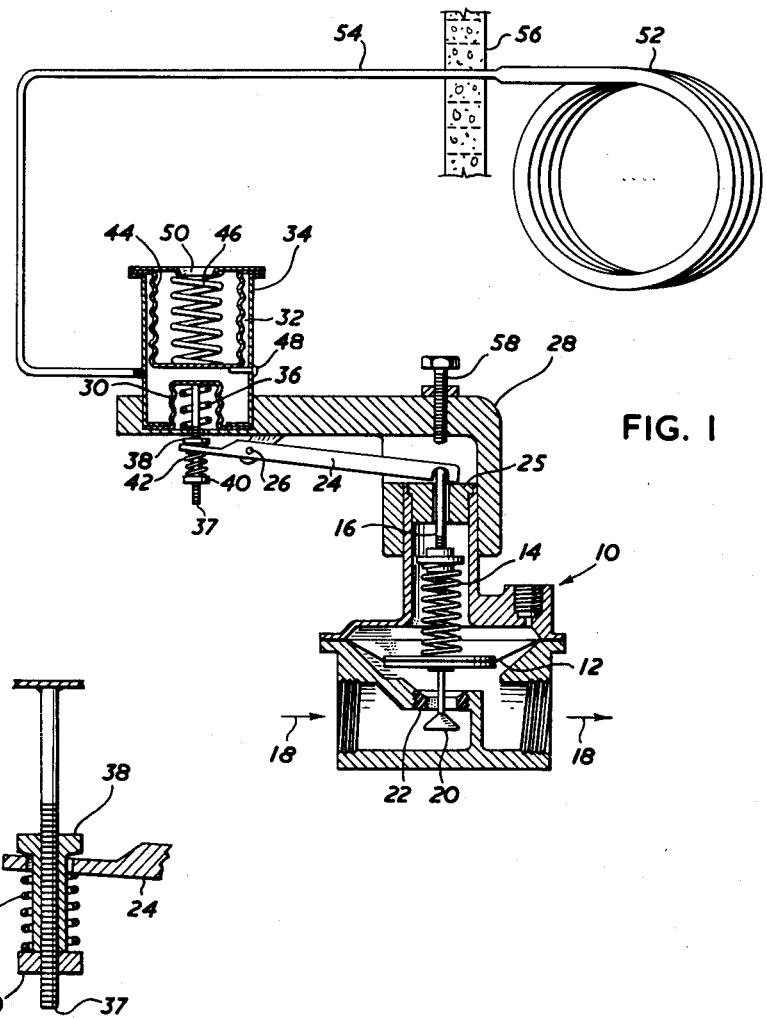

May 4, 1965  H. G. HILL  3,181,789
CONTROL SYSTEM FOR MODULATING GAS BURNER
OPERATION ON FORCED AIR HEATING SYSTEMS
Filed Jan. 11, 1961  3 Sheets-Sheet 2

INVENTOR
HAROLD G. HILL
BY: Fetherstonhaugh & Co
ATTORNEYS

May 4, 1965

H. G. HILL 3,181,789

CONTROL SYSTEM FOR MODULATING GAS BURNER
OPERATION ON FORCED AIR HEATING SYSTEMS

Filed Jan. 11, 1961

3 Sheets-Sheet 3

INVENTOR
HAROLD G. HILL

BY *Fisher, Christen, Sabol & Caldwell*

ATTORNEYS

United States Patent Office

3,181,789
Patented May 4, 1965

3,181,789
CONTROL SYSTEM FOR MODULATING GAS BURNER OPERATION ON FORCED AIR HEATING SYSTEMS
Harold G. Hill, 530 Lacroix St., Chatham, Ontario, Canada
Filed Jan. 11, 1961, Ser. No. 81,971
Claims priority, application Great Britain, Jan. 13, 1960, 1,197/60
10 Claims. (Cl. 236—10)

This invention relates to a method for regulating the pressure of gas supplied to a gas burner by increasing the supply pressure in response to a drop in outdoor temperature and decreasing supply pressure in response to a rise in outdoor temperature. It also relates to apparatus for carrying and putting the method into effect.

It is well known to those skilled in the art of heating buildings that a steady flow of heat supply to the heating system is essential for uniform temperatures in all rooms. Intermittent heat supply is to be avoided as much as possible but cannot be entirely eliminated in gas fired space heating equipment because of ignition and venting problems associated with very low combustion rates. This invention provides a compromise which co-ordinates outside weather temperature with the gas burner rate of combustion.

In order to understand the improvements of this invention, a basic knowledge of the problem involved is essential and those skilled in the art of forced warm air heating recognize that continuous air circulation is one means of obtaining maximum comfort conditions. When an air circulating blower stops, the warmer air in a room rises and the cool air from windows falls to the floor so that drafts may be felt by some occupants. At the same time, the ductwork cools off so when the blower resumes operation, the temperature of air delivered into rooms which are remote fom the furnace, will be initially much cooler than the heated air delivered to rooms near the furnace. This creates unbalanced heating and is particularly objectionable during mild winter weather when possibly only one quarter of the furnace heating capacity is required.

Previous improvements have been made by others to shorten the gas burner "on" periods by using delicate thermostat controls and while these are beneficial, the "on" time must still be sufficient to allow a vent or chimney to heat up and thereby expel the products of combustion outside the building. This minimum time is generally about three minutes so the burner may be "on" for three minutes and "off" for twelve minutes. During the twelve minutes' "off," the blower automatically shuts off to prevent circulating air that would be too cool for the occupant's comfort. It is, therefore, obvious that if the rate of combustion can be reduced to forty percent then the same heat supply (in B.t.u. per hour) can be obtained by having alternate nine minute "on" and nine minute "off" periods. With such an operation, the blower control will permit continuous air circulation because the heated air from the furnace will not drop below the acceptable minimum for comfort. This invention accomplishes the desirable rate of combustion within practical limits which do not affect venting or ignition requirements.

The problem described in relation to forced warm air heating systems also exists in hot water and steam heating systems where it is equally desirable to maintain uniform temperatures in all radiators or convectors.

The invention essentially comprises a lever adapted to control a spring loaded diaphragm type pressure regulating valve and means, including a diaphragm in contact with a temperature responsive liquid within a sealed system that includes an outside temperature sensing device, for moving the lever in response to volumetric change of the liquid over a predetermined range only of volumetric change to regulate the regulating valve. The invention will be clearly understood after reference to the following detailed specification read in conjunction with the drawings.

Figure 3:
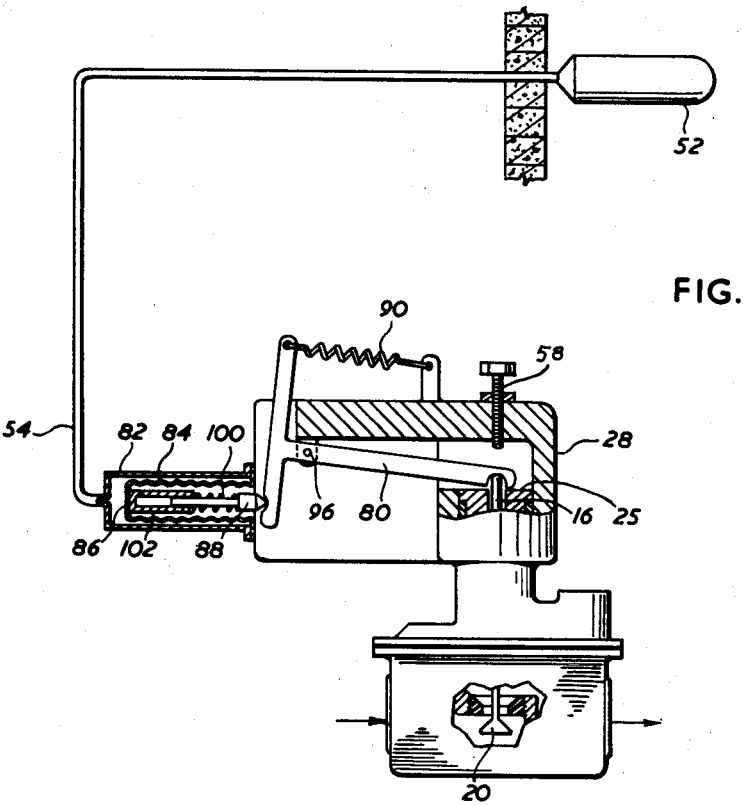
Figure 4:
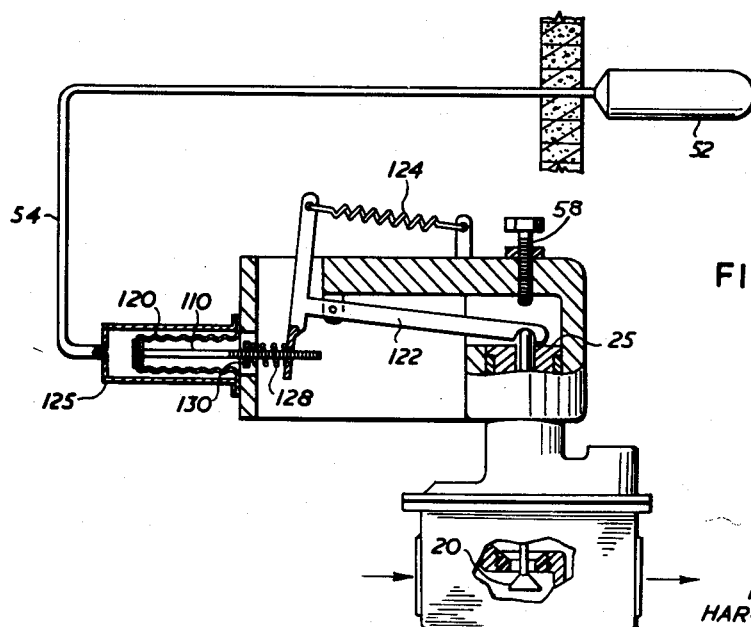
Figure 5:
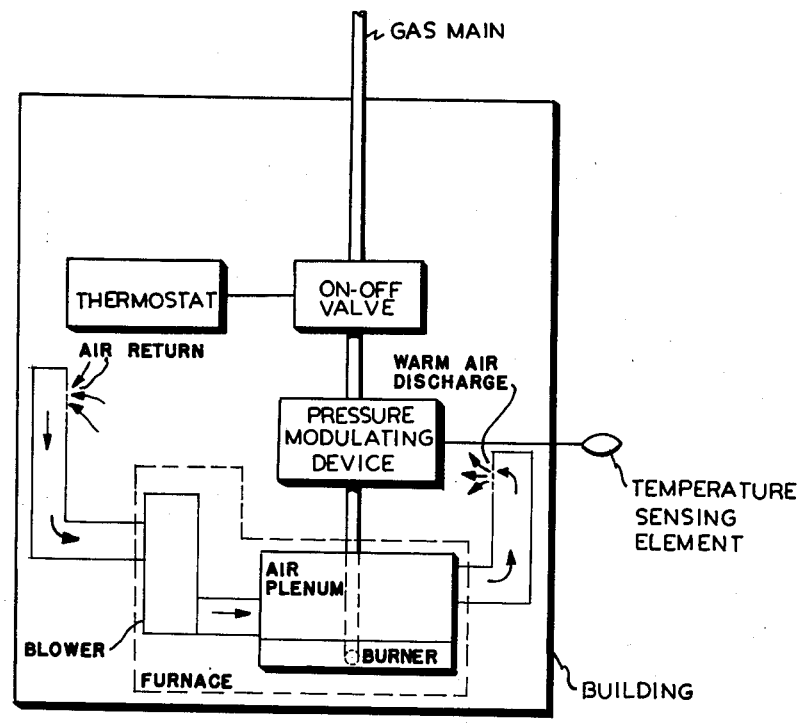

In the drawings:
FIGURE 1 is a sectional view through a gas pressure regulating valve, and means according to this invention for regulating its operation in accordance with outside temperature variation.
FIGURE 2 is a detail of the lever connection to the diaphragm stem shown in FIGURE 1.
FIGURE 3 illustrates an alternative embodiment of the invention.
FIGURE 4 illustrates a still further alternative embodiment of the invention.
FIG. 5 illustrates an embodiment of the system of the invention.

Referring to the drawings, the numeral 10 generally refers to a type of valve normally used to regulate line gas pressure as it flows to a furnace. It, by its setting, controls the rate at which gas is burned. This valve has a diaphragm 12 urged downwardly by the compressed spring 14, the compression of which is normally adjusted by turning a plug threaded into the upper portion of the casing that engages with the stem 16.

In use, gas flows in the direction of the arrows 18, and the pressure of the flowing gas on the underside of the diaphragm 12 balances against the force of the spring 14 to control the position of the valve element 20 with respect to its seat 22. If the pressure on the input side of the valve were to increase, a greater force would be exerted against the underside of the diaphragm 12 to compress the spring 14 against its rigid adjusting nut and thereby move the valve 20 towards its seat to restrict the opening and reduce the pressure on the output side. The operation is the converse in the case where the gas pressure on the input side is reduced below normal. Thus, the valve tends to keep the pressure of the output to the burner constant. Variation in the pressure at the output can be achieved by varying the compression of the spring 14 by means of the threaded plug referred to previously.

This spring loaded diaphragm type pressure regulating valve and its manner of use to achieve a manually regulated output pressure is well-known to those skilled in the art.

This invention relates to a method of regulating output gas pressure in accordance with outside temperature and to the provision of a means for automatically varying the setting of the spring loaded diaphragm type valve when used to supply gas to a furnace heating a building by automatically reducing the output pressure when the outside temperature is relatively high, and increasing the output pressure when the outside temperature is relatively low. As indicated in the preamble to this specification, such variation in the setting of the regulating valve results in a more even temperature in the building being heated, especially in milder weather.

In the embodiment of the invention shown in FIGURE 1, the valve 10 is set automatically by means of the lever 24 that is pivotally mounted as at 26 on bracket 28 carried by the valve 10 as shown. Lever 24 engages with the stem 16 to control the depression thereof between limits of its travel, and thereby to control the compression of the spring 14 and consequent setting of the regulating valve 10.

The position of the lever 24 is controlled by a means that includes the diaphragm of a bellows 30 which are maintained in contact with a liquid 32 contained within the sealed container 34 by means of the compressed spring 36. Spring 36 is compressed between a plate on the inside and atmospheric side of the bellows 30 and the frame or bracket 28, within which the sealed chamber 34 is mounted. A stem 37 extends from the under and atmospheric side of the bellows 30 onto the threaded free end of which is threaded a shouldered sleeve 38 and a retaining nut 40. The lever 24 has an enlarged hole adjacent one free end thereof that extends around the sleeve 38 but which will not pass over the shoulder thereof. A compressed spring 42 extends between the underside of the lever 24 and the nut 40. Nut 40 also threads on the end of stem 37.

The numeral 44 refers to a second bellows that extend into the chamber 34, which have a spring 46, normally compressed to force the bellows into the liquid 32 and against the stop 48. Bellows 44 are open to the atmosphere on one side as at 50.

The numeral 52 refers to a temperature sensing element. It is adapted to be mounted at a point remote from the chamber 34, and the sealed interior thereof communicates with the interior of the chamber 34 through a small bore tube 54. The temperature sensing element can be a coil or bulb having a relatively large volume by comparison with the volume of the chamber 34 and is filled with a fluid that responds to temperature variation with volumetric variation, as will be referred to later. In use, it will be mounted outdoors while the regulating valve 10 and its control will be mounted indoors and near the gas burner. The numeral 56 refers to schematic illustration of an outside building wall and is intended to show the exterior mounting of the temperature sensing coil 52.

The lever 24 has been illustrated in one of its extreme positions in FIGURE 1, as limited by the engagement of lever 24 with the plug 25 of valve 10 of the bracket 28. It is limited in travel in the opposite direction by means of the screw 58, which can be manually set. It will also be apparent that the threaded position of the sleeve 38 can be varied longitudinally of the threaded stem 37 that extends from the atmospheric side of the bellows 30 to vary the relative position of the bellows 30 and the position of the lever 24 longitudinally of the stem when the stop 25 is just engaged as contraction of the liquid first takes place.

The bulb 52, line 54 and chamber 34 are filled with a fluid such as methyl alcohol, which has a high coefficient of thermal-expansion and does not freeze. The volume of the sensing element 52 is relatively large when compared with the volume of the chamber 34 and the tube 54, so that the total volume of the fluid in the system is essentially determined by the temperature of the sensing element 52 and the unit 52 thereby is enabled to act as a temperature sensing element for the unit.

In use, the temperature sensing element is mounted outside a building to be heated, as indicated by its passage through the wall 56, and the regulating valve 10 together with its control is mounted inside the building near the gas burner that is supplying the furnace. The embodiment of the invention shown comprises the lever 24 and a means, such as the one shown, which includes a bellows 36 for moving the lever in response to outdoor temperature conditions, as sensed by the liquid in the unit 52 to control the setting of the spring 14 and therefore the regulating valve.

When the outside temperature is low, the volume of liquid in the system comprised of the chamber 34, line 54 and sensing element 52 will be relatively small due to the effect of temperature on coil 52, and the compressed spring 36 will assert itself to maintain the diaphragm of the bellows 30 in contact with the liquid and carry the lever 24 to the limit of its travel, as indicated in FIGURE 1. Further contraction of the liquid will result in further inward travel of the bellows 30 with the result that the spring 42 is further compressed as the stem 36 travels upwardly. Such further travel, however, does not affect the position of the valve 20, which is in its full open position as illustrated in FIGURE 1, to give maximum output pressure through the valve 10.

As the outside temperature warms up again, the fluid in the sealed system will expand, due to the effect of temperature on element 52, and compress bellows 30 against spring 36 to move the stem 37 in a downward direction. Initial downward movement of the stem does not move the lever 24 because the spring 42 must first reassert itself. Once spring 42 has reasserted itself, however, further downward movement of the stem results in a movement of the lever 24 to raise the end thereof that engages with the stem 16. As this end is raised, the spring 14 of the valve tends to reassert itself with a resulting raising of the valve 20 towards its seat 22. This will continue as temperature is raised out of doors until lever 24 hits the bottom of the set screw 58. When this occurs, the lever 24 has reached the other extremity of its movement, and further expansion of the fluid in the sealed system is taken by the contraction of the bellows 44 against the compressed spring 46. It will be noted that spring 46 has a greater stiffness than spring 36, so that spring 36 is compressed to cause engagement of lever 24 and stop 58 before spring 46 is compressed. When lever 24 is in contact with pin 58, the valve 20 is at its upper extremity of travel and the output pressure from the valve 10 is at its lowest predetermined limit as set by the pin 58.

As the outside temperature again cools down, the liquid contracts and bellows 44 reasserts itself under the influence of spring 46 until bellows 44 strikes the stop member 48. Further reduction in volume of the fluid in response to further lowering of the temperature results in a reassertion of the spring 36 to force the bellows 30 to expand and carry the end of lever 24 that engages with the stem 16 in a downward direction to again open the valve 20 further.

Thus, there is a range of movement for the lever 24 between the two stops 58 and 25 which is controlled and varies in accordance with the outside temperature of the building as sensed by the sensing element 52. Beyond this predetermined range, the sensing element has no control over the lever and hence valve position.

On a very cold day the fluid in the closed system is contracted due to the effect of cold outside temperature thereon and the valve 20 is actuated to its full open position. Bellows 44 is fully expanded as shown in FIGURE 1 and bellows 30 are expanded to compress spring 42. As the temperature increases initially, no change in the valve position takes place, but as bellows 30 compresses to take up the expanding liquid in the system spring 42 reasserts itself. When the temperature reaches a predetermined point say 9° F., the spring 42 has fully reasserted itself, and the bellows 30 compresses further with a resulting counter-clockwise turning of the lever 24 to permit the valve 20 to move towards its closed position. This continues with rising temperature and expansion of liquid in the coil 52 and chamber 34 until the lever 24 hits the stop 58, at which time the valve 20 is in its most closed down position as close as it can get to its seat 22. Further increase in temperature does not result in any further closing down of the valve 20, as explained above.

The notable thing is that the travel of the lever 24 varies the loading on a spring 14 of the spring loaded diaphragm type pressure regulating valve 10 in response to volumetric change of the liquid over a predetermined range only of volumetric change.

This predetermined range of volumetric change can be varied by adjusting the position of the sleeve 38 and nut 40 on the stem 37 at one end and by adjusting the set screw 58 at the other end. With the former adjustment, one varies the position of the bellows 30 at which the lever 24 is at one end of its travel. Accordingly, the highest outside temperature at which the valve is opened its maximum amount is set. At the other end of the range, the second adjustment determines the lowest outside temperature at which the valve is at its most closed position. The on and off operation of the burner is, of course, always controlled by the room thermostat. This invention controls the pressure of the fuel gas supplied to the burner.

FIGURE 3 illustrates an alternative method of moving the lever in response to volumetric change of the liquid over a predetermined range only and its volumetric change to regulate the gas pressure to the burner. In this case, similar numerals have been used to designate similar parts. A pivotally mounted bell crank lever 80 is employed, one end of which engages with the upper end of the stem 16 of the valve 10 as before. A chamber 82 is filled with a temperature sensitive liquid and is connected to a fluid filled bulb such as the bulb 52 by means of the line such as the line 54, as described above. A bellows 84 having corrugated side walls that are expansible and collapsible as the pressure is reduced and increased respectively on the end 86 thereof enters the chamber 82. The inside of the bellows 84 is open to the atmosphere as shown and a bellows follower 88 which is adapted to follow the expansion and contraction of the bellows 84 over at least a portion of its travel is provided for engagement with the pivotally mounted lever 80. A tensioned spring 90 connects with the lever 80 and with a post of the bracket 28 and has a strength that will hold the lever 80 against the plug 25 to keep the valve 20 in its most depressed position, when the bellows is in the position illustrated in FIGURE 3. The position illustrated in FIGURE 3 is one that corresponds to a cold outside temperture in which the valve 20 is opened to its maximum position and the bellows 84 are expanded considerably.

As the outside temperature warms up, the liquid in the temperature sensing device expands and forces the bellows 84 to contract. As they do so, they engage with the actuating element 88 to carry it into contact with the pivotally mounted lever 80 and turn it in a counterclockwise direction about its pivotal mounting 96 against the tension of spring 90 to somewhat relieve the spring 14 of the regulating valve 10. This raises the valve 20 towards its valve seat as before. When the lever 80 engages with the pin stop 58 as the temperature outside rises further contraction of the bellows 84 is absorbed by compression of the spring 100 between the rim of the cylinder 102 and the shoulder on the end of the following element 88.

Cooling down of the outside temperature results in a reversal of the above described process.

In FIGURE 4 there is illustrated a manner of using the one piece expansible and collapsible type of bellows illustrated in FIGURE 3 with a resilient connection between the lever 80 and the bellows similar in principle to the one illustrated in FIGURE 1 of the drawings. In this case, a stem 110 extends from the atmospheric side of a bellows 120 and the free end thereof passes through a hole in the arm of the lever 122. As the bellows expand with contracting fluid due to temperature drop, the stem 110 is drawn away from the lever and the spring 124 causes the lever to follow the stem until the lever reaches its extreme position as determined by a stop 25. Further expansion of the bellows does not result in movement of the lever 122.

The numeral 128 refers to a spring between a nut 130, the position of which on the stem can be threadedly adjusted. As the liquid in the sensing device 52 and chamber 125 expands due to rising temperature, the bellows contract and the spring 128 is brought into engagement with the lever to turn the lever against the pressure of spring 124 until it reaches a stop 58. When the lever reaches its stop, further contraction of the bellows is absorbed by compression of the spring 128 as it is compressed between the nut 130 and the lever 122.

It will be apparent that by varying the position of the nut 130 on the stem 110 that the position of the bellows 120 in which the leading end of the spring 128 first engages with the lever 122 as the bellows are contracted can be varied. Thus, one limit of the range of volumetric expansion to which the operation of the valve responds can be controlled in a similar manner to that described for the embodiment of FIGURE 1.

In a normal gas furnace installation one would have the usual pilot safety valve, gas pressure regulator and gas supply "on" and "off" control in that order. The pressure modulating device, according to this invention, would be mounted in the line downstream from the on-off control; thus, the burner operates in the normal fashion in response to heat demand as dictated by a room thermostat, but the gas supply pressure to the burner is modulated in accordance with outdoor temperature by the present invention so that on milder days the burner is in operation for greater periods of time because of the reduced pressure of the gas supply to the furnace than it would be if the pressure were not modulated and only controlled by the normal gas pressure regulator.

The emodiments of this invention other than the ones illustrated will be apparent to those skilled in the art and it is not intended that the scope of this patent should be limited thereby.

What I claim as my invention is:

1. In a forced air heating system for a building including a gas furnace equipped with a burner connected by building piping to a supply of gas and an automatic on-off gas supply valve interposed between said burner and said supply, said gas supply valve being responsive to the temperature within said building to open at a predetermined lower inside temperature and close at a predetermined higher inside temperature, the improvement comprising, in combination therewith, a gas supply modulating device interposed inside said building between said gas supply and said burner to modulate the rate of gas flow to said burner, said modulating device being responsive to the temperature outside of said building to vary said rate of gas flow in the range from a predetermined maximum at not greater than a lower predetermined outside temperature to a predetermined minimum at not less than a higher predetermined outside temperature.

2. In a forced air heating system for a building including a gas furnace equipped with a burner connected by building piping to a supply of gas and an automatic on-off gas supply valve interposed between said burner and said supply, said gas supply valve being responsive to the temperature within said building to open at a predetermined lower inside temperature and close at a predetermined higher inside temperature, the improvement comprising, in combination therewith, a gas supply modulating device interposed inside said building between said gas supply and said burner to modulate the rate of gas flow to said burner, said modulating device comprising a sealed chamber, a temperature sensing element for mounting at a point outside of said building, said sensing element having a sealed interior in liquid connection with said sealed chamber, a liquid that responds to temperature variation with volumetric variation in said chamber and said sensing element, a lever attached to vary the loading of the spring of a spring loaded diaphragm type pressure regulating valve as it moves and means including a diaphragm in contact with said liquid for moving said lever in response to volumetric change of said liquid over a predetermined range only of volumetric change to regulate said valve as aforesaid.

3. Means for regulating a pressure regulating valve as claimed in claim 2 having means for adjusting the predetermined range of volumetric change of said liquid that said lever moves in response to as aforesaid.

4. Means for regulating a pressure regulating valve as claimed in claim 2, in which said means for moving said lever in response to volumetric change over a predetermined range only, as aforesaid, includes a stop means engageable by said lever when the lower volumetric limit of said predetermined range of volumetric change of said liquid is achieved whereby to limit the movement of said first lever in a first direction and resilient means connecting said diaphragm and lever adapted to permit relative movement between said diaphragm and said first lever in response to volumetric change of said liquid when the volume thereof is below the lower limit of said predetermined range of volumetric change.

5. Means for regulating a pressure regulating valve as claimed in claim 4, in which said means for moving said lever, in response to volumetric change over a predetermined range only, further includes a second stop engageable by said lever when the upper limit of said predetermined range of volumetric change of said liquid is achieved, and means for absorbing further volumetric increase of said liquid in said chamber beyond the upper limit of said predetermined range of volumetric change.

6. Means for regulating a pressure regulating valve as claimed in claim 5, having a second stop means engageable by said lever as the upper limit of said predetermined range of volumetric change of said liquid is achieved to prevent movement of said lever in response to movement of said bellows beyond the upper limit of said predetermined range of volumetric change and resilient means for absorbing volumetric expansion of said liquid above said predetermined range of volumetric change.

7. Means for regulating a pressure regulating valve as claimed in claim 2 in which said means for moving said lever, in response to volumetric change over a predetermined range only, includes spring means loaded to urge said lever into contact with a bellows following element, a stop engageable by said lever when the lower limit of said predetermined range of volumetric change of said liquid is achieved to stop said lever from following said bellows following element as it moves in response to volumetric change of said liquid at a volume below said predetermined range of volumetric change.

8. Means for regulating a pressure regulating valve as claimed in claim 7 having a second stop means engageable by said lever as the upper limit of said predetermined range of volumetric change of said liquid is achieved to prevent movement of said lever in response to movement of said bellows beyond the upper limit of said predetermined range of volumetric change and resilient means for absorbing volumetric expansion of said liquid above said predetermined range of volumetric change.

9. Means for regulating a pressure regulating valve as claimed in claim 8, in which the upper and lower limit of said predetermined range of volumetric change can be varied by changing the position of said first stop and said second stop.

10. A method for regulating the pressure of gas supplied to an intermittently operated gas burner, the operation of which is controlled by a room thermostat by increasing the supply pressure in response to a dropping outside temperature and decreasing the supply pressure in response to a rising outside temperature, comprising the steps of sensing variations in outdoor temperature by means of a liquid that responds to temperature variation with volumetric variation, transmitting the effect of the volumetric variation in the liquid at the outdoor location to a location indoors and adjacent the gas burner, operating a control lever in response to the effect of volumetric variation of the liquid at the indoor location over a predetermined range only of volumetric change of the liquid, employing the movement of said lever to vary the spring loading of a spring loaded diaphragm type pressure regulating valve to control the gas pressure as aforesaid.

References Cited by the Examiner

UNITED STATES PATENTS

| | | | |
|---|---|---|---|
| 607,406 | 7/98 | Coe | 236—102 |
| 1,618,243 | 2/27 | Timmons | 126—113 |
| 1,853,194 | 4/32 | Bogle | 236—9 X |
| 1,917,893 | 7/33 | Mancib | 236—92 |
| 1,925,530 | 9/33 | Gotthardt | 236—99 |
| 1,934,504 | 11/33 | Jennings | 236—91 |
| 2,032,041 | 2/36 | Beck | 236—91 X |
| 2,054,481 | 9/36 | MacLean | 137—139 |
| 2,212,285 | 8/40 | Ayers | 236—92 X |
| 2,231,696 | 2/41 | Wolfe | 137—484.4 |
| 2,334,803 | 11/43 | Andersson | 236—92 |
| 2,898,928 | 8/59 | Kehoe | 236—92 X |
| 2,905,389 | 9/59 | Eskin | 236—92 |

OTHER REFERENCES

Bulletin No. 225, "Sylphon Pressure and Vacuum Regulators," published by Fulton Sylphon Company, copyright 1930, page 10 relied on.

EDWARD J. MICHAEL, *Primary Examiner.*

PERCY L. PATRICK, ALDEN D. STEWART, *Examiners.*